United States Patent
Chen et al.

(10) Patent No.: US 7,867,324 B2
(45) Date of Patent: *Jan. 11, 2011

(54) FUEL SYSTEM AND METHOD OF REDUCING EMISSION

(75) Inventors: Alexander G Chen, Ellington, CT (US); Jeffrey M. Cohen, Hebron, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/463,448

(22) Filed: May 11, 2009

(65) Prior Publication Data

US 2010/0064894 A1  Mar. 18, 2010

Related U.S. Application Data

(63) Continuation of application No. 11/247,653, filed on Oct. 11, 2005, now Pat. No. 7,537,646.

(51) Int. Cl.
*B01D 53/22* (2006.01)
*F23D 11/44* (2006.01)

(52) U.S. Cl. ............... 96/6; 96/9; 96/11; 96/13; 96/417; 96/422; 95/8; 95/14; 95/46; 95/54; 55/385.1; 60/736; 60/737; 60/740; 60/267; 123/552; 123/553; 123/555; 123/557; 431/11

(58) Field of Classification Search .......... 96/4, 96/6, 7, 9, 11, 12, 13, 417, 422; 95/1, 8, 95/14, 45, 46, 54; 55/385.1; 60/734, 736, 60/737, 739, 740, 266, 267; 123/525, 543, 123/552, 553, 555, 557; 165/148, 151; 431/11
See application file for complete search history.

(56) References Cited

U.S. PATENT DOCUMENTS

| 2,979,293 | A | 4/1961 | Mount |
| 4,744,801 | A | 5/1988 | Taylor et al. |
| 5,473,882 | A | 12/1995 | Zarzalis et al. |
| 6,142,222 | A | 11/2000 | Kang et al. |
| 6,279,551 | B1 | 8/2001 | Iwano et al. |
| 6,315,815 | B1 | 11/2001 | Spadaccini et al. |
| 6,581,576 | B1 | 6/2003 | Rousseau |
| 6,598,471 | B2 | 7/2003 | Imoehl |

(Continued)

FOREIGN PATENT DOCUMENTS

EP   1544437   6/2005

(Continued)

OTHER PUBLICATIONS

European Search Report mailed on Oct. 3, 2009 for EP 06 25 5233.

*Primary Examiner*—Jason M Greene
(74) *Attorney, Agent, or Firm*—Carlson, Gaskey & Olds PC

(57) ABSTRACT

A fuel system includes a fuel deoxygenator for removing oxygen from a liquid fuel. A vaporizer is in fluid communication with the fuel deoxygenator. The vaporizer vaporizes at least a portion of the liquid fuel to produce vaporized fuel. At least a portion of the vaporized fuel pre-mixes with oxidizer to reduce formation of undesirable emissions.

11 Claims, 2 Drawing Sheets

U.S. PATENT DOCUMENTS

| | | |
|---|---|---|
| 6,709,492 B1 | 3/2004 | Spadaccini |
| 6,820,659 B2 | 11/2004 | Sauer |
| 7,017,329 B2 | 3/2006 | Farhangi et al. |
| 7,028,490 B2 | 4/2006 | Tomlinson |
| 7,537,646 B2 * | 5/2009 | Chen et al. ............... 96/6 |
| 2002/0083714 A1 | 7/2002 | Bakholdin |
| 2004/0194627 A1 | 10/2004 | Huang et al. |
| 2005/0137441 A1 | 6/2005 | Cordatos et al. |
| 2005/0211096 A1 | 9/2005 | Burlatsky et al. |

FOREIGN PATENT DOCUMENTS

| | | |
|---|---|---|
| EP | 1557357 | 7/2005 |
| EP | 1559883 | 8/2005 |
| EP | 1736652 | 12/2006 |
| WO | WO 03/098019 | 11/2003 |
| WO | WO2005/025718 | 3/2005 |

* cited by examiner

FUEL SYSTEM AND METHOD OF REDUCING EMISSION

RELATED APPLICATION

This application is a continuation of U.S. patent application Ser. No. 11/247,653, which was filed Oct. 11, 2005, issued as U.S. Pat. No. 7,537,646B2 on May 26 2009.

BACKGROUND OF THE INVENTION

This invention relates to combustion engines or combustors and, more particularly, to a fuel system arrangement for reducing undesirable emissions from combustion engines or combustors.

Conventional liquid-fueled combustion engines or combustors typically include a fuel system that supplies liquid fuel to a combustor. The liquid fuel reacts with oxidizer or oxidizers to produce a rapidly expanding gas that moves a piston or turbine blades, for example, to propel a vehicle or to produce heat for other applications. Disadvantageously, the combustion may result in the production of undesirable emissions, such as oxides of nitrogen ($NO_x$), carbon monoxide (CO), uncombusted fuel (UHC), and carbonaceous soot.

Conventional combustion engines or combustors have not satisfactorily addressed the undesirable emissions. Many conventional combustion engine assemblies seek to reduce emissions by more efficiently combusting the liquid fuel in compressed air or oxidizer. This reduces only a portion of the emissions that result from incomplete combustion of the liquid fuel. The formation of some emissions, such as $NO_x$ however, is more closely related to combustion temperature than to the efficiency of combustion. Therefore, increasing the combustion efficiency does not significantly reduce emissions of $NO_x$.

One proposed solution for minimizing undesirable emissions includes combusting the liquid fuel in compressed air or oxidizer at a lower temperature to reduce formation of the emissions. This may reduce formation of some of the emissions, however, it increases the amount of uncombusted fuel (i.e., reduces combustion efficiency). The increase in uncombusted fuel may negate a significant portion of the benefit accrued from the reduction in the formation of the emissions.

Accordingly, there is a need for a fuel system arrangement that provides lower temperature combustion to reduce formation of emissions while maintaining combustion efficiency and combustor operability. Combustor operability relates to the maintenance of a robust, stable combustion process. Combustors with poor operability may experience "blow-out" events in which the flame is extinguished. Poor operability may also lead to large combustor pressure oscillations which can cause noise and vibration problems and decrease combustor durability. This invention addresses these needs and provides enhanced capabilities while avoiding the shortcomings and drawbacks of the prior art.

SUMMARY OF THE INVENTION

This invention is a fuel system including a fuel deoxygenator (coke reduction device) and a vaporizer for supplying vaporized fuel to a combustor.

An exemplary fuel system according to the present invention includes a fuel deoxygenator for removing oxygen from a liquid fuel and a vaporizer in fluid communication with the fuel deoxygenator. The vaporizer vaporizes at least a portion of the liquid fuel received from the fuel deoxygenator to produce vaporized fuel.

In another example, the fuel system additionally includes a mixer or mixers in fluid communication with the vaporizer for mixing the vaporized fuel with an amount of oxidizer. A controller is in communication with the vaporizer and the mixer or mixers for controlling the fuel/oxidizer mixture ratio exiting the mixer or mixers.

An exemplary method of reducing emissions of an undesirable combustion product according to the present invention includes vaporizing at least a portion of a liquid fuel to produce vaporized fuel and the mixing of vaporized fuel with oxidizer to produce a mixture of vaporized fuel and oxidizer. The mixture of vaporized fuel and oxidizer is then reacted in a combustor. The flame temperature of the vaporized fuel and oxidizer mixture is lower than that of the direct combustion in the oxidizer of the liquid fuel from which the vaporized fuel was produced. This reduces the formation of at least a portion of undesirable combustion products. Local injection of liquid fuel into the combustor may be used to "pilot" the combustion process in order to insure good combustor operability. In addition, the ratio of liquid fuel flow rate to vapor fuel flow rate may be adjusted in order to ensure good operability. The fuel injection process is managed by a controller, which controls the distribution of both vapor and liquid fuel to one or a multiplicity of fuel injectors and/or mixers. This distribution of fuel flows and the ratio of liquid fuel flow rate to vapor fuel flow rate are the key control parameters, and can be varied by the controller in order to minimize a cost function that accounts for both pollutant emissions and operability. This controller may operate in an "open-loop" or "set-point" fashion, in which the fuel distribution and flow rate ratios are determined a priori, or it may operate in a "closed-loop" or "active" fashion, in which the fuel distribution and flow rate ratios are determined based on information received by a sensor or sensors that measure the emissions and operability of the combustor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
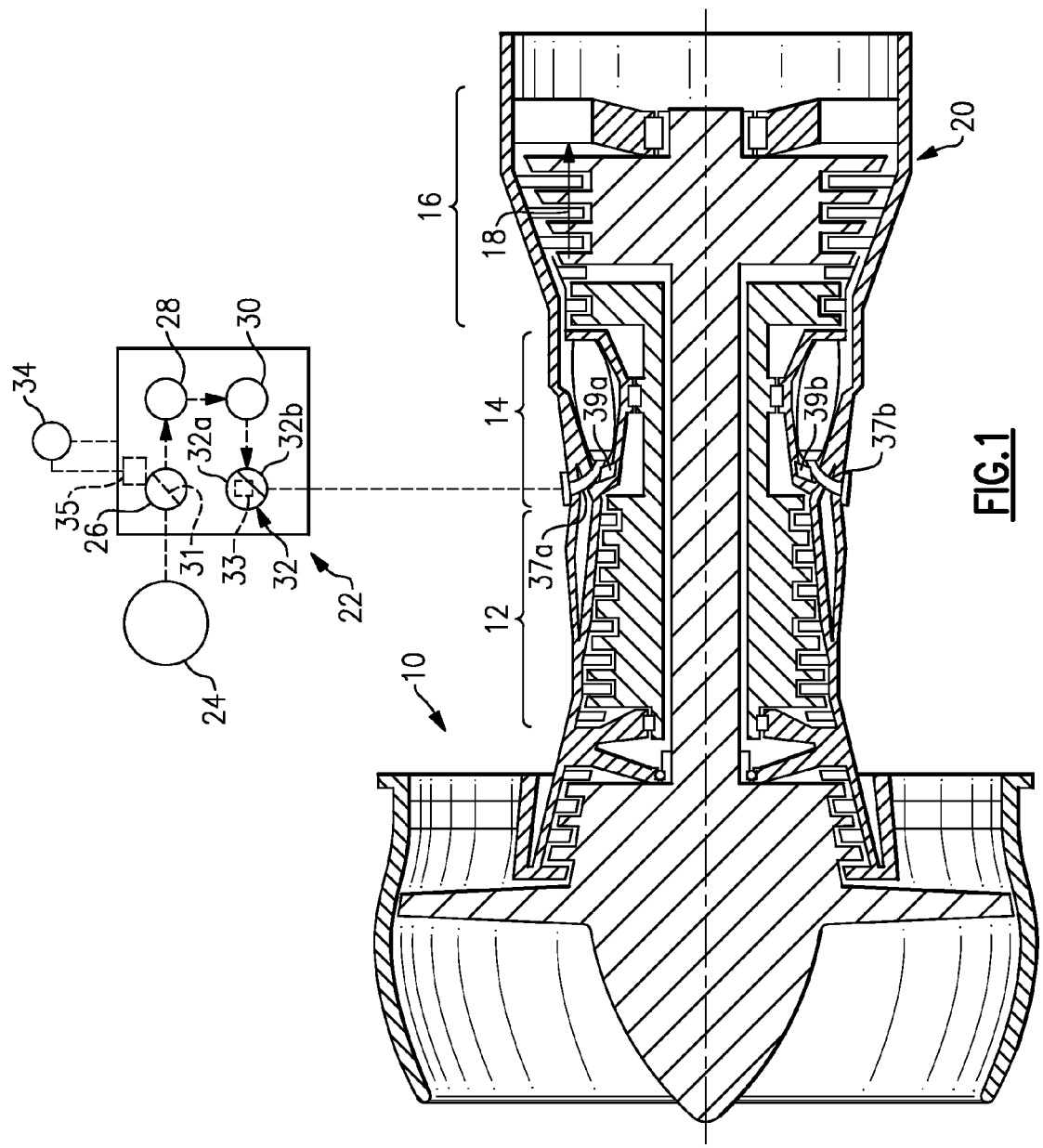
FIG. 1 is a schematic view of a combustion engine assembly having a fuel system according to the present invention.

FIG. 1 illustrates selected portions of an example combustion engine assembly 10, such as a gas turbine engine for an aircraft. In this example, the combustion engine assembly 10 includes a compressor 12, a combustor 14, and a turbine 16. The combustion engine assembly 10 operates in a known manner, feeding compressed air or oxidizer from the compressor 12 to the combustor 14. The compressed air or oxidizer is mixed with fuel and react to produce a flow of hot gases 18. The turbine 16 transforms the flow of hot gases 18 into mechanical energy to drive the compressor 12. An exhaust nozzle 20 directs the hot gases out of the combustion engine assembly 10 to provide thrust to the aircraft or other vehicle.

A fuel system 22 supplies fuel to the combustor 14. A fuel storage 24 holds liquid fuel. The liquid fuel is received by a fuel deoxygenator 26 from the fuel storage 24 with or without the assistance from a fuel pump. The fuel deoxygenator 26 removes or reduces dissolved oxygen from the liquid fuel before the liquid fuel is received by a pump 28.

The pump 28 receives the low oxygen, liquid fuel from the deoxygenator 26 and pressurizes the liquid fuel to move the liquid fuel through the fuel system 22 to a vaporizer 30. The vaporizer 30 heats the pressurized liquid fuel to a vaporization temperature. The heating within the vaporizer 30 is controlled to vaporize all, or alternatively, a portion of the liquid fuel. In one example, the vaporizer 30 acts as a heat sink for the vehicle by absorbing waste heat from other parts or hot gas to help heat the liquid fuel and cool the parts or hot gas. This provides the benefit of reduced energy consumption compared to previously known fuel systems because the waste heat is used to heat the liquid fuel.

In one example, the fuel deoxygenator 26 reduces an amount of dissolved oxygen in the liquid fuel. Preferably, the oxygen level is below 1 ppm. As is known, liquid fuel may dissolve quantities of atmospheric gases such as oxygen. The dissolved oxygen can lead to the formation of carbonaceous deposits called "coke" when heated, which may lead to build-up of deposits and hinder the functionality of a fuel system. If the dissolved oxygen level of the liquid fuel is significantly above 1 ppm, significant coking during vaporization of the liquid fuel in the vaporizer 30 may occur and require constant cleaning of deposits. Utilizing the fuel deoxygenator 26 to reduce the dissolved oxygen level to less than 1 ppm minimizes coking and allows the liquid fuel to be heated to a temperature higher than 325° F. to vaporize the liquid fuel without significant coking.

Preferably, the fuel deoxygenator 26 includes a known arrangement that utilizes an oxygen partial pressure differential across a porous membrane filter 31 to remove the oxygen from the liquid fuel. One example is found in U.S. Pat. No. 6,315,815, however, given this description, one of ordinary skill in the art will recognize other deoxygenator arrangements to meet their particular needs. Alternatively, or in combination with the known deoxygenator arrangement, a known anti-coking additive is added to the liquid fuel to reduce coking.

The vaporized fuel moves from the vaporizer 30 into a mixer or mixers 32. The mixer or mixers 32 combines, or premixes in other terms, the vaporized fuel with oxidizer 33 and moves the mixture of vaporized fuel and oxidizer to the combustor 14.

The vaporized fuel of the disclosed example combusts at a relatively high combustion efficiency and complete combustion, even at relatively low combustion temperatures. In previously known fuel systems, it was difficult to mix an appropriate amount of compressed air or oxidizer with the liquid fuel such that complete combustion would occur. Utilizing vaporized fuel, however, a uniform mixing between the compressed air or oxidizer and the gaseous vaporized fuel is achieved, which results in the relatively high combustion efficiency and complete combustion at relatively low combustion temperatures. As described above, combustion at relatively low temperatures reduces formation of emissions such as $NO_x$ that are produced at relatively high combustion temperatures. Thus, the disclosed example fuel system 22 provides lower temperature combustion to reduce formation of emissions of $NO_x$, CO, UHC and soot while maintaining or increasing combustion efficiency. In one example, the combustion temperature is between 1400° F. and 3000° F. to reduce emissions.

The uniform mixing of compressed air or oxidizer and vaporized fuel provides the benefit of a more uniform production of combustion heat within the combustor 14 than for previously known liquid fuel systems. The uniform production of combustion heat in the combustor 14 in turn provides more uniform gas temperatures over the area of the turbine 16 to enhance the life of the turbine, for example. The uniform production of combustion heat and the low combustion temperature in the combustor 14 also enhances the life of the combustor, for example.

Optionally, the fuel system 22 includes a controller 34 for controlling operation of the fuel system 22. The controller 34 is in communication with the fuel deoxygenator 26, pump 28, vaporizer 30, mixer or mixers 32, and fuel injector or injectors 37a, 37b, 39a, 39b. The controller 34 controls the fuel system 22, as described below for example, to achieve enhanced combustor 14 operability.

Combustor 14 operability relates to the maintenance of a robust, stable combustion process. The combustor 14 may experience a "blow-out" event in which the flame is extinguished or relatively large oscillation in pressure within the combustor 14.

These combustor 14 events result from an undesirable ratio of liquid fuel and oxidizer, the ratio of vaporized fuel and oxidizer or from an undesirable percentage of the liquid fuel that is vaporized (e.g., a ratio or percentage that causes "blow out" or pressure oscillation). In response to such events, the controller 34 adjusts the ratio of liquid fuel and oxidizer, the ratio of vaporized fuel and oxidizer and the percentage of liquid fuel that is vaporized, or some or all of them. This provides the benefit of producing or maintaining a robust and stable combustion process. The liquid fuel can be sent to a liquid injector 39a or 39b in the combustor 14, which may or may not be incorporated with the vaporized fuel injectors 37a and 37b.

In one example, the controller 34 monitors and controls the pressure and temperature of in the combustor 14 or combustors. The controller 34 then changes an amount of oxidizer mixed with the vaporized fuel in the mixer or mixers 32 in response to the pressure and temperature to enhance operability and emissions.

In another example, the controller 34 selectively adjusts a ratio of oxidizer and vaporized fuel for different mixers 32 (indicated by 32a and 32b) to enhance operability and reduce emissions.

In another example, the controller 34 controls the vaporizer 30 or the amount of liquid fuel sent to the vaporizer 30 to selectively adjust a percentage of liquid fuel that is vaporized to enhance operability and emissions.

In another example, the controller 34 commands the fuel system 22 to produce a first ratio of vaporized fuel and oxidizer for one fuel injector 37a and a second, different ratio of vaporized fuel and oxidizer for the an other fuel injector 37b. Although only two injectors are shown, it is to be understood that the ratio of vaporized fuel and oxidizer to other injectors or groups of injectors can also be controlled. This provides the benefit of precisely tailoring the ratio of oxidizer and vaporized fuel that is supplied to different injectors to maximize the combustor operability and emission benefits.

In another example, the controller 34 commands the fuel system 22 to produce a first flow rate of liquid fuel for one liquid injector 39a and a second, different flow rate of liquid fuel for the other liquid injector 39b. Although only two liquid injectors are shown, it is to be understood that the flow rates to other liquid injectors or groups of liquid injectors can also be controlled. This provides the benefit of precisely tailoring the liquid fuel flow rates of different liquid fuel injectors to maximize the combustor operability and emission benefits.

Optionally, the fuel deoxygenator 26 includes an oxygen sensing device 35 for indicating the dissolved oxygen level of liquid fuel entering the vaporizer. The oxygen sensing device 35 sends signals to the controller 34 based upon the oxygen level. The controller 34 changes the temperature within the vaporizer 30 based upon the oxygen level to minimize coking. That is, if the oxygen level is near an upper end of an oxygen level range, the controller reduces the temperature within the vaporizer 30 and if the oxygen level is near a lower end of the oxygen range the vaporizer 30 increases the temperature.

Figure 2:
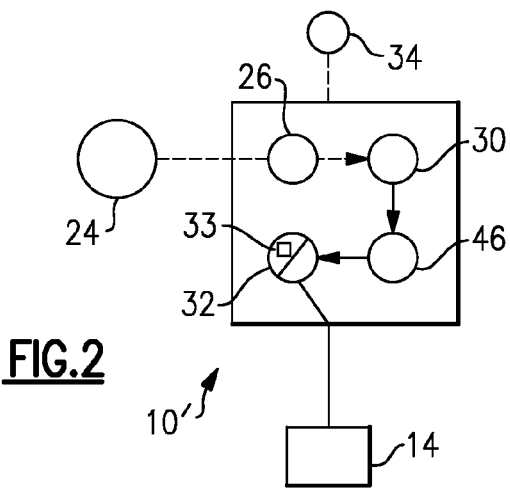
FIG. 2 is a schematic view of a second embodiment of an example fuel system according to the present invention.

FIG. 2 illustrates selected portions of another example fuel system 10' that includes a compressor 46 instead of the pump 28 shown in the example of FIG. 1. In this example, the compressor 46 is located between the vaporizer 30 and the mixer or mixers 32. The compressor 46 receives vaporized fuel from the vaporizer 30 at a first pressure and compresses the vaporized fuel to a second pressure that is greater than the first pressure. The pressurized vaporized fuel is then mixed with oxidizer 33 in the mixer or mixers 32, as described above, and supplied to the combustor 14. Utilizing the compressor 46 to pressurize the vaporized fuel provides the benefit of tailoring the pressure of the vaporized fuel to match that of an internal pressure within the combustor 14.

Figure 3:
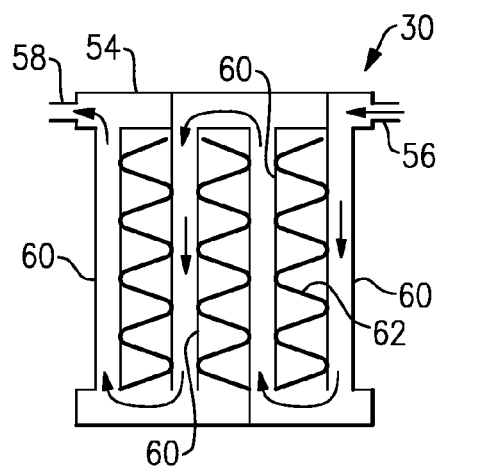
FIG. 3 is a schematic view of an example vaporizer.

FIG. 3 shows selected portions of an example vaporizer 30 that includes a heat exchanger 54. In the example shown, the heat exchanger 54 includes an inlet port 56 in fluid communication with an outlet port 58. Deoxygenated liquid fuel or liquid fuel with low concentration of dissolved oxygen from the fuel deoxygenator 26 enters the inlet port 56 and flows through a series of fluidly connected tube portions 60. The tube portions 60 are separated from each other by fins 62. The space between the tube portions 60 and the fins 62 provides an open area for the flow of a heated fluid such as air as shown in the side view of the heat exchanger 54 in FIG. 4.

Figure 4:
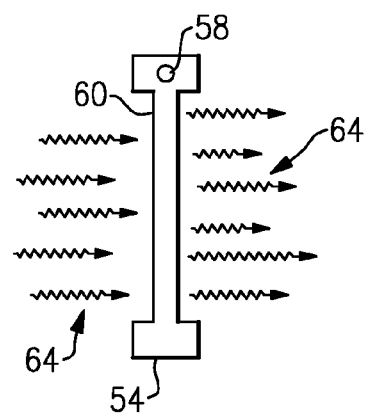
FIG. 4 is a schematic view of the vaporizer of FIG. 3, during operation.

In the example shown in FIG. 4, relatively hot fluid 64 is blown between the tube portions 60 such that heat from the hot fluid 64 is conducted through walls of the tube portions 60 to the liquid fuel flowing within the tube portions 60. When the liquid fuel in the tube portions 60 reaches the vaporization temperature of the corresponding pressure, the liquid fuel vaporizes into a gas. The vaporized fuel then exits the heat exchanger 54 through the outlet port 58.

Figure 5:
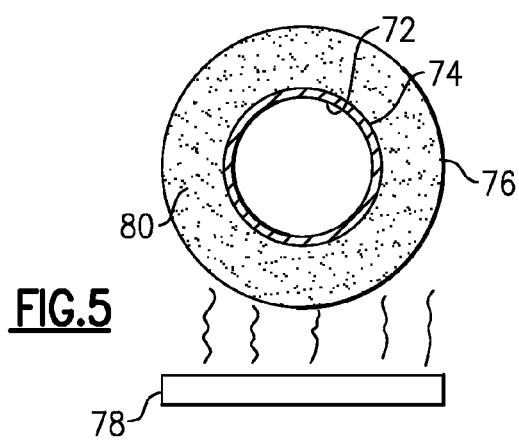
FIG. 5 is a schematic view of a second embodiment of an example vaporizer.

FIG. 5 illustrates selected portions of another vaporizer 30 that includes a tube 72 having an outer periphery 74 that is surrounded by a porous metal foam 76. In this example, a heat source or sources 78 adjacent to the tube 72 provides heat. The porous metal foam 76 transfers the heat to the tube 72, which conducts the heat to the liquid fuel that passes through the tube 72. When the liquid fuel reaches the vaporization temperature of the corresponding pressure, the liquid fuel vaporizes into a gas as described above.

In the illustrated example, the porous metal foam 76 includes a plurality of pores 80. In the event that fuel escapes from the tube 72, the porous metal foam 76 and pores 80 provide the benefit of allowing fuel to escape without a pressure build-up within the metal foam 76. The pores 80 also prevent the escaping fuel from the tube 72 from combusting with the oxidizer in the metal foam 76.

The disclosed examples provide the benefit of reduced emissions by reducing the oxygen level in liquid fuel enables the liquid fuel to be vaporized without significant coking. The vaporized fuel premixed with the oxidizer combusts at a relatively low combustion temperature, which reduces formation of $NO_x$ emissions, yet the temperature is high enough to reduce the CO, UHC and soot emissions. A controlled distribution of both vaporized and liquid fuel among different fuel injectors ensures that sufficient combustor operability is maintained.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A fuel system comprising:
   a fuel deoxygenator that includes a porous membrane filter that removes dissolved oxygen from the liquid fuel;
   a vaporizer in fluid communication with the fuel deoxygenator for vaporizing at least a portion of the liquid fuel to produce vaporized fuel; and
   a controller in communication with the vaporizer and operable to control the vaporizer responsive to a desired ratio of the vaporized fuel to an oxidizer.

2. The system as recited in claim 1, wherein the vaporizer includes a heat exchanger having a conduit that transfers heat from a heat source to the liquid fuel, the conduit having at least a portion that is embedded in a porous metal foam.

3. The system as recited in claim 2, wherein the conduit includes a tube having an outer periphery and the porous metal foam surrounds the outer periphery.

4. The system as recited in claim 1, wherein the vaporizer includes a plurality of tube portions that transfer heat from a heat source to the liquid fuel and fins that separate the tube portions from each other.

5. The system as recited in claim 1, comprising a combustor in fluid communication with the vaporizer for combusting at least the vaporized fuel.

6. The system as recited in claim 5, comprising at least one mixer in fluid communication between the vaporizer and the combustor for mixing at least a portion of the vaporized fuel with the oxidizer.

7. The system as recited in claim 6, comprising a compressor in fluid communication between the vaporizer and the combustor.

8. The system as recited in claim 1, comprising a pump in fluid communication between the fuel deoxygenator and the vaporizer.

9. The system as recited in claim 1, wherein the fuel deoxygenator includes a fuel additive for passivating coking in the liquid fuel when the liquid fuel is heated.

10. The system as recited in claim 1, wherein the controller selectively changes a ratio of a mixture of the vaporized fuel and an oxidizer depending on which one of a plurality of fuel injectors is to receive the mixture.

11. The system as recited in claim 1, wherein the controller selectively changes the heating temperature within the vaporizer based upon an oxygen level of the liquid fuel.

* * * * *